US012257689B1

(12) United States Patent
Verellen

(10) Patent No.: US 12,257,689 B1
(45) Date of Patent: Mar. 25, 2025

(54) TOOL BIT CADDY

(71) Applicant: Gerard M. Verellen, Snover, MI (US)

(72) Inventor: Gerard M. Verellen, Snover, MI (US)

( * ) Notice: Subject to any disclaimer, the term of this patent is extended or adjusted under 35 U.S.C. 154(b) by 276 days.

(21) Appl. No.: 17/803,045

(22) Filed: Jan. 21, 2022

Related U.S. Application Data

(60) Provisional application No. 63/206,039, filed on Jan. 23, 2021, provisional application No. 63/206,047, filed on Jan. 22, 2021.

(51) Int. Cl.
*B25G 1/08* (2006.01)
*B25B 23/16* (2006.01)
*B25H 3/00* (2006.01)
*B65D 85/20* (2006.01)

(52) U.S. Cl.
CPC .............. *B25G 1/085* (2013.01); *B25B 23/16* (2013.01); *B25H 3/003* (2013.01); *B65D 85/20* (2013.01)

(58) Field of Classification Search
CPC ........ B25G 1/085; B25B 23/16; B25H 3/003; B25H 5/00; B25H 3/04; B65D 85/20; A47F 5/0025; A47F 5/0853; A47F 5/10
See application file for complete search history.

(56) References Cited

U.S. PATENT DOCUMENTS 4,030,599 A 6/1977 Bruni
4,043,230 A * 8/1977 Scrivens ................. B25B 13/56 81/439
4,880,122 A * 11/1989 Martindell ............. B25H 3/003 206/374
5,098,235 A 3/1992 Svetlik et al.
5,813,532 A 9/1998 Kheradpir et al.
D403,508 S 1/1999 Kheradpir et al.
6,283,291 B1 9/2001 Vasudeva et al.
6,840,377 B2 * 1/2005 Yu .......................... B25G 1/085 221/80
7,073,417 B2 7/2006 Beauchamp
7,237,673 B2 7/2007 Wikle et al.
7,334,970 B2 2/2008 Kozak
8,636,287 B2 1/2014 Wienhold (Continued)

OTHER PUBLICATIONS

BitMag tool bit holder, online advertising materials, 21 pages, printed Jan. 21, 2021A.D.

(Continued)

*Primary Examiner* — Ko H Chan
(74) *Attorney, Agent, or Firm* — Christopher John Rudy

(57) ABSTRACT

Caddy removably secures and stores tool bit not in use, and allows its storage again. It has body with well opening(s) extending in a first direction and releasably receiving at least a portion of the bit including a detent fixing member; passageway extending in communication with the well opening; and detent securing member movable in the passageway and penetrating into the well opening. The detent securing member has at least one lateral surface residing in the well opening when positioned in a first, bit-securing position to interact with the detent fixing member to secure the bit in the at least one well opening; when positioned in a second, bit-releasing position, the at least one part of the at least one lateral surface does not interact with the detent fixing member so that the bit is not secured and may be removed. The caddy is attachable to the tool.

20 Claims, 2 Drawing Sheets

(56) References Cited

U.S. PATENT DOCUMENTS

| | | | | |
|---|---|---|---|---|
| 9,259,508 | B2 | 2/2016 | Serafin, Jr. | |
| 9,701,008 | B2 * | 7/2017 | Cho | B25F 5/029 |
| 10,823,658 | B2 | 11/2020 | Diebold et al. | |
| 10,906,714 | B2 * | 2/2021 | Chen | B25H 3/003 |
| 10,914,719 | B2 | 2/2021 | Selby et al. | |
| 11,192,235 | B2 | 12/2021 | Steele et al. | |
| 11,565,036 | B2 * | 1/2023 | Rau | A61M 5/008 |
| 11,904,453 | B2 * | 2/2024 | Nooner | F16M 13/02 |
| 2003/0110909 | A1 * | 6/2003 | Liou | B25B 19/00 81/466 |
| 2004/0079662 | A1 * | 4/2004 | Wang | B25H 3/003 206/378 |
| 2006/0288531 | A1 * | 12/2006 | Hu | B25G 1/085 16/111.1 |
| 2008/0178712 | A1 * | 7/2008 | Brown | B25G 1/085 81/450 |
| 2008/0319005 | A1 | 12/2008 | Furet et al. | |
| 2016/0158924 | A1 * | 6/2016 | Tsai | B25B 23/16 81/177.8 |
| 2016/0243695 | A1 * | 8/2016 | Billups, Jr. | B25H 3/003 |
| 2018/0065792 | A1 * | 3/2018 | Chen | B25H 3/003 |

OTHER PUBLICATIONS

DeWalt tool bit holder, online advertising screenshot, 1 page, printed Jan. 21, 2021 A.D.

Spider Tool Holster, online advertising materials, 10 pages, printed Jan. 21, 2021 A.D.

* cited by examiner

TOOL BIT CADDY

This claims the priority benefits under 35 USC 119(e) of U.S. provisional patent application Nos. 63/206,047 filed on Jan. 22, 2021 A.D., and 63/206,039 filed on Jan. 23, 2021 A. D. The specifications of those applications in their entireties, to include their drawings, are incorporated herein by reference.

FIELD AND PURVIEW OF THE INVENTION

The invention concerns a caddy for removably securing a tool bit for use with a tool when the bit is not in use with the tool, the caddy being attachable to the tool, and, in combination, the caddy attached to the tool. As an example, the caddy can mechanically hold a plurality of bits for use in a hand-held, cordless electric power impact drill and be attached to the drill, with one of the bits being removed for use with the drill and returned to the caddy thereafter as may be desired. It also concerns methods for making and using the caddy, and a combination of the caddy attached to the tool.

BACKGROUND TO THE INVENTION

One of the more frustrating occurrences for a worker such as a carpenter, other builder, handyman, or do-it-yourselfer during construction or repair work with a hand-held power tool such as a drill, saw, wrench, or other tool that uses removable bits is the need to attach to or change a bit on the tool that is more suitable to the job at hand. For example, at one moment the bit may be a flat-bladed screwdriver bit for screwing or unscrewing standard slotted screws, but at the next moment a Phillips or star-drive bit may be required for a Phillips head or star-headed screw. The problem usually centers around searching for the proper bit, which may be found away from the worksite or even just out of reach; hidden, say, in p pocket or pouch or under construction materials or papers; or worse yet, lost. The problem can be exacerbated when a part to be fastened needs to be held or steadied in place by the worker, who, at the time, must search for the proper bit to accomplish the task of fastening the part, or call to a coworker or friend to supply the bit. Also, on the worksite, someone may take the worker's bit if they see it laying around, presuming it is his. Significant and costly inefficiencies can result.

In attempts to address problem(s) from among the foregoing or related occurrences, others are known to have employed, disclosed or otherwise reported, plastic sideways-fitting press-in bit holders; tight fitting, squeezing plastic or rubber tube bit holders; and magnetic bit holders. For example, Ulf Nilsson has a Bitmag™ magnetic bit holder, which briefly is a block having a plurality of holes into which tool bits are inserted and held with magnets, and which is mounted onto a tool such as a hand-held, cordless electric power drill with a screw or double-sided tape.

Drawbacks with those attempts include that plastic and rubber devices may wear rather quickly and become loose, which, although it may make bits easier to remove and replace, it also allows bits to be accidentally dislodged during use of the tool. Plastic sideways-fitting press-in type bit holders may wear sooner than desired, and may allow bits it holds to release when the bit is accidentally moved in the direction of the open side from which the tool bit was pressed-in. And, magnetic bit holders can attract a build-up of hard to remove debris such as iron shavings, and for this reason and reliance on magnetic force alone, which may be of insufficient strength to hold bits through rough working conditions, the magnetic bit holders may allow bits to be accidentally dislodged during use of the tool. In addition, in particular, although other magnetic bit holders are intended for impact drill bits, it appears that the Bitmag™ magnetic bit holder is not intended for such bits as they sit too high in the block for the hand to comfortably hold the driver and for the bits to not be easily knocked out; the block attaches too high on drivers, not leaving room for the hand, even with shorter bits; and through its single screw attachment feature, even with employment of double-sided tape itself or in conjunction with the screw as the adhesive can fail with extended use and exposure to substances encountered at the worksite or in storage, it is not affixed in a manner that prevents it from rotating loosely during use.

It would be desirable to ameliorate, if not avoid or solve, one or more of the problems as noted above or as otherwise known in the art. It would be desirable more particularly to provide an amelioration, avoidance, or solution to such problems, in which a removable tool bit for a tool can be securely stored with a device so that the bit can be conveniently and efficiently removed for use with the tool, and when not employed with the tool, if desired, conveniently, efficiently, and securely stored again. It would be desirable to provide the art an alternative.

A SUMMARY OF SOME EMBODIMENTS OF THE INVENTION

In address of the foregoing, provided hereby is a caddy for removably securing and storing a tool bit for use with a tool when the bit is not in use with the tool, and upon removal from the tool, when desired, storing it again therein, which comprises the following:

- a body having at least one well opening therein, which extends in a first direction and is configured to releasably receive at least a portion of the bit, wherein the at least one portion of the bit includes a detent fixing member;
- a passageway extending in communication with the well opening;
- a detent securing member movable in the passageway and penetrating at least in part into the well opening, the detent securing member having at least one lateral surface that resides in the well opening when the detent securing member is positioned in a first, bit-securing position such that at least part of the at least one side surface interacts with the detent fixing member of the bit to secure the bit when the bit is received in the at least one well opening of the body; and such that, when the detent securing member is positioned in a second, bit-releasing position such that the at least one part of the at least one lateral surface does not interact with the detent fixing member of the at least one portion of the bit so that the bit is not secured in the at least one well opening;

wherein the caddy is configured to be attachable to the tool, and, as a detent with respect to the detent fixing member and the detent securing member, removably secure and store the tool bit for use with the tool when the bit is not in use with the tool, and upon removal from the tool, when desired, store it again therein. Also, a support, a means for attaching the caddy to the tool, and so forth can be provided.

Provided as well is a combination comprising the caddy attached to the tool. In addition, methods of making the caddy, of attaching it to the tool, and of using the caddy itself or in combination with the tool are provided.

The invention is useful in building and repair work.

By the invention, the art is advanced in kind, and provided an alternative. One or more problems as noted above or as otherwise known in the art is or are ameliorated if not avoided or solved. More particularly provided is an amelioration, avoidance or solution in which a removable tool bit for a tool can be securely stored with a device, here, the present caddy, so that the bit can be conveniently and efficiently removed for use with the tool, and when not employed with the tool, if desired, conveniently, efficiently, and securely stored again. In general, the invention allays, if not avoids, problems centered around searching for the proper bit, which may be found away from the worksite or even just out of reach, hidden, say, in a pocket or pouch or under construction materials or papers; or worse yet, lost. These problems can be exacerbated when a part to be fastened needs to be held or steadied in place by the worker, who, at the time, must search for the proper bit to accomplish the task of fastening the part, or call a coworker or friend to supply the bit. With the invention, however, bits can be stored close at hand, and accessed and re-stored easily and quickly. And so, significantly less time is lost; and bits are not misplaced or missing, or positioned out of reach, just when they are needed most. Then too, the invention prevents accidental loss or theft of bits when the worker and/or his coworker(s) have their own bit holders since each person has his own bits with him when he is working, and there is no need to borrow from each other. Workers who have used the invention have praised it. The invention is efficient to make, and convenient and efficient to use.

Numerous further advantages attend the invention.

DRAWINGS IN BRIEF

The drawings form part of the specification hereof. With respect to the drawings, which are not necessarily drawn to scale, the following is briefly noted:

ILLUSTRATIVE DETAIL

Figure 1:
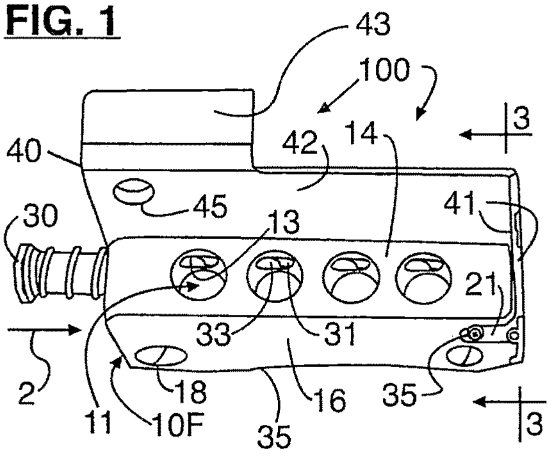
FIG. 1 is top, outside perspective view of a tool bit caddy embodiment hereof.
Figure 5:
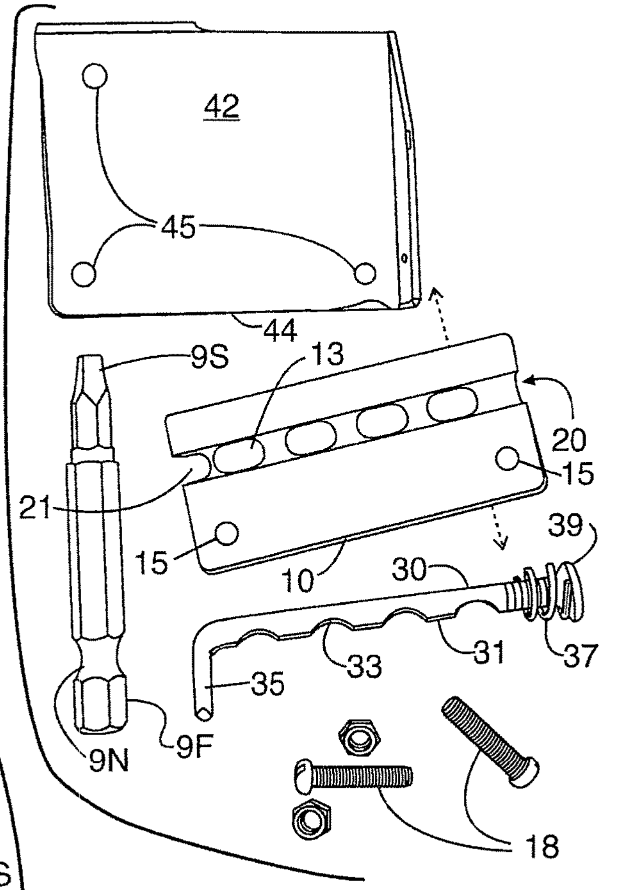
FIG. 5 is an exploded view of a caddy embodiment such as of FIG. 1, and a tool bit that can be held therein when the caddy is assembled.
Figure 2:
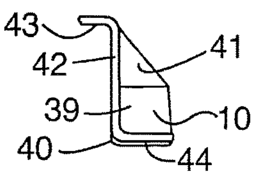
FIG. 2 is a first end, elevational view of the caddy embodiment of FIG. 1, taken along the direction of arrow 2 in FIG. 1.
Figure 3:
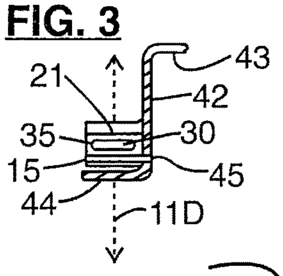
FIG. 3 is a second end, sectional view of the caddy embodiment of FIG. 1, taken in the direction of section lines 3 in FIG. 1.
Figure 4:
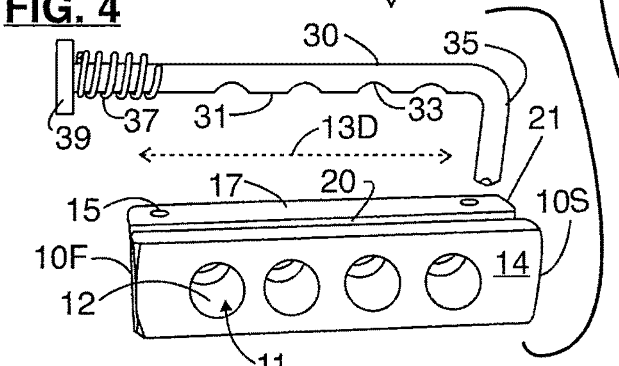
FIG. 4 is an exploded top, inside perspective view of a body having a plurality of well openings therein and a securing member for residence and sliding in a channel of the body, such as found in the caddy embodiment of FIG. 1.
Figure 6:
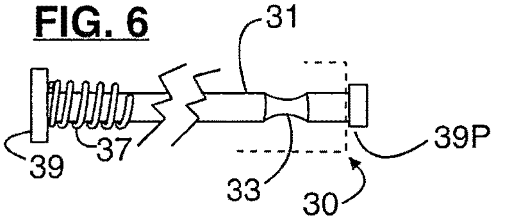
FIG. 6 is a view of another embodiment of a securing member in a form of a shaft having a plurality of encircling notches, a head and an opposing peened head.
Figure 7:
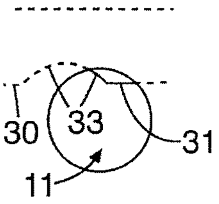
FIG. 7 is a top view of a well opening as in FIG. 1 in which resides at least part of a lateral surface of a securing member. In this position, a bit can be held.
Figure 8:
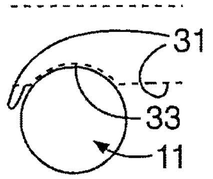
FIG. 8 is a top view of the well opening of FIG. 7, in which the lateral surface of the securing member is slid from the well to allow removal or insertion of a bit.

The invention can be further understood by the following detail, which, as with the foregoing, is to be taken in an illustrative, not necessarily limiting sense:

The present caddy is for removably securing and storing a tool bit for use with a tool when the tool bit, which has a portion thereof that includes a detent fixing member, is not in use with the tool, and, after removal from the tool, when desired, storing it again therein. Tool bit release and storage may be more active (FIGS. 1-9) or passive (FIGS. 10D-10G). In general, the caddy is configured to be attachable to the tool, and, as a detent with respect to the detent fixing and detent securing members, releasably secure and store the tool bit for use with the tool when the bit is not in use with the tool, and upon removal from the tool, when desired, store it again therein. In general, it includes a body, a passageway, and a detent securing member.

The body has at least one well opening therein, which extends in a first direction and is configured to releasably receive at least a portion of the bit. At least one portion of the bit includes the detent fixing member.

The passageway extends in communication with the well opening.

The detent securing member is movable in the passageway and can penetrate at least in part into the well opening. The detent securing member has at least one laterally extending, i.e., lateral, surface that resides in the well opening when the detent securing member is positioned in a first, bit-securing position such that at least part of the at least one lateral surface interacts with the detent fixing member of the bit to secure the bit when the bit is received in the at least one well opening of the body; and such that, when the detent securing member is positioned in a second, bit-releasing position such that the at least one part of the at least one lateral surface does not interact with the detent fixing member of the at least one portion of the bit, the bit is not secured in the at least one well opening so as to be able to be removed therefrom.

The detent fixing member may be a detent catch, and the detent catch may be in a form of a detent shoulder, concavity or perforation. The detent securing member may be a biased spring element for interacting with the detent fixing member, say, a spring-biased plunger, which may be a ball-nose or long-nose spring plunger, or, say, snap tab(s) or a spring snap fastener such as of an S-spring press fastener. Nonetheless, the detent fixing member, as may be appropriate, may be made of element(s) of the aforementioned detent securing member, for instance, being a spring-biased plunger with the detent securing member being the ball-nose or long-nose plunger. As well, the detent securing member may reside and be slidable in the passageway, which may extend through at least part of the body in a second direction different than the first direction and in communication with the well opening, and which has at least one lateral surface that resides in the well opening when the detent securing member is positioned in a first, bit-securing position such that at least part of the at least one lateral surface interacts with at least part of the at least one portion of the bit, i.e., as the detent fixing member, to secure the bit when the bit is received in the at least one well opening of the body. Also, the detent securing member may have at least one notch in the at least one side surface, which passes into a gap when the detent securing member is positioned in a second, bit-releasing position such that the at least one part of the at least one lateral surface does not interact with the detent fixing member of the at least one portion of the bit so that the bit is not secured in the at least one well opening.

By the word, "bit," when used in relation to a tool, is meant a replaceable part of a compound tool that actually performs the end function of the tool, for example, boring, drilling, sanding, grinding, filing, cutting, screwing, unscrewing, cleaning, mopping, magnetically attracting, and so forth and the like. The bit can include a first portion that is received in the compound tool for transmitting working force or motion to a second portion that actually performs the end function of the tool. Thus, the bit, which may be magnetic or not, may be a drill tip, a reaming tip, an abrasive-mounting disc or disc support such as a rotating sandpaper-holding disc or disc support, a grinding wheel, a file blade, a circular saw blade, a screwdriver tip, a wrench socket, a removal tip for broken screws, a bore cleaning tip with a slot to insert a cleaning patch, a mop, a magnetic pick up rod, a wire brush, an extension bit, a universal joint bit, and so forth and the like.

The caddy can be made with any suitable material(s). For example, employed may be such suitable structural materials as metal(s) and/or metal alloy(s) such as of or with beryllium, scandium, magnesium, aluminum, titanium, vanadium, chromium, manganese, iron, cobalt, nickel, copper, zinc and/or tin, with alloys including brass, mild steel, stainless steel, and those with aluminum, and so forth and the like; plastic(s) such as of or with polyamide(s), epoxy(ies), nylon(s), polycarbonate(s), polyurethane(s) and so forth and the like; fiber-reinforced plastic composite(s) such as of a carbon fiber-polycarbonate, a carbon fiber-polysulfone, a carbon fiber-polyetherketone, a polyaramid fiber-polycarbonate, a polyaramid fiber-polysulfone and/or or a polyaramid fiber-polyetherketone, and so forth and the like; ceramic(s) such as an alumina, titanium nitride and/or a zirconia, for example, magnesium oxide stabilized, transformation toughened zirconia such as found in Serafin, Jr. et al., U.S. Pat. No. 9,259,508 B2, and so forth and the like; and/or wood, wood substitutes, and so forth and the like. Various adhesives, for example, polymethylmethacrylate, an epoxy and/or a hot melt adhesive; and/or mechanical fasteners, for example, bolts, screws, rivets and/or pins, can be employed, as may be magnetic substances. The lattermost, however, may collect materials such as iron cuttings, shavings or filings, and may be avoided. Material(s) may be substantially non-magnetic and/or non-resilient.

Casting, forging, rolling, hammering, cutting, welding, baking, coating, grinding, drilling, tapping, and so forth and the like may be employed. Some finished or semi-finished parts may be commercially obtained.

With reference to the drawings, caddy 100 can be employed in combination with tool 8, for instance, a hand-held, electrically or pneumatically powered tool, for example, a hand-held, cordless, electrically powered drill, to removably secure and, when not in use, store tool bit 9 having a detent fixing member. The caddy 100 includes body 10 in which is provided passageway 20 that accommodates slidable securing member 30, as a detent securing member.

The tool 8 may be any suitable tool that employs exchangeable bits 9. The tool 8 may have slot 8S, which otherwise may receive a belt clip and/or another accessory. Thus, as illustrated, the tool 8 may be a Makita cordless electric impact drill for which the caddy 100 may be configured as an accessory that can be mounted thereto. The caddy 100 may be modified to be configured for mounting various other models and brands of tools 8 as well.

As illustrated, the bit 9 may be embodied with an exemplary ¼-inch hexagonal shank, which typically is elongate and includes first portion 9F with a regular hexagonal cross-section and circumferentially surrounding neck 9N, which can be received in and held by the tool 8 for transmitting working force or motion to second portion 9S of the bit 9 so that it performs the end function of the tool 8.

The body 10, for example, of aluminum or an aluminum alloy, has first end 10F and second end 10S, and one well opening 11 or a plurality of well openings 11, each well opening 11 configured, for example, as a blind, cylindrical hole, say, of an about ¼-inch diameter or more or less, e.g., about 5/16 of an inch, and about ¾-inch depth more or less, e.g., about 11/16 of an inch, to releasably receive at least a portion of the bit 9, say, as noted above embodied with a ¼-inch hexagonal shank, first portion 9F, and surrounding neck 9N, which, when not received in a well opening 11, can be received in and held by the tool 8 for transmitting working force or motion to second portion 9S of the bit 9 that performs the end function of the tool 8. The at least one well opening 11 extends in first direction 11D and has bit-guiding, laterally containing surface 12, conveniently, for example, in a form of at least one wall, extending in the first direction 11D, with gap 13 through or in the wall 12, which spans in second direction 13D different from the first direction 11D, for example, substantially perpendicular thereto, so as to provide open communication with a corresponding well opening 11. Although well opening(s) 11 may open in any useful direction, they advantageously open through top 14 of the body 10. Rather than being blind, well opening(s) 11 may be open through the body 10, which generally would entail providing a stop or support for the bit(s) in such well opening(s) that otherwise are conveniently provided by the noted blind end. Mounting hole(s) 15 may be provided, say, which pass through outside wall 16 and inside wall 17, for introduction of fasteners 18, for example, bolts.

The passageway 20, which may be in a form of a lengthwise open groove or channel, is positioned in the inside wall 17 and extends through at least part of the body 10 in the second direction 13D, and is in communication with the gap 13 such that the passageway 20 communicates with the well opening(s) 11. A passageway may be made to be non-open lengthwise such as provided by drilling a cylindrical hole in the body 10 or cutting or molding the passage into a polygonal or curvilinear shape along its length. Slot 21, for example, may open at the second end 10S of the body 10 and be in communication with the channel 20.

The exemplary slidable securing member 30, for example, an elongate cylindrical rod or shaft of any suitable cross-section, say, circular (round), elliptical, oval, curvilinear, say, semicircular, or polygonal, say, triangular, square, hexagonal, octagonal, and so forth and the like—an expedient of which may be provided by employment and modification of a #9 or #10, 3-inch common nail—resides and is slidable lengthwise in the passageway 20 and can penetrate a pertinent gap 13 to enter into a corresponding well opening 11 for interaction with an inserted bit 9. The slidable securing member 30 has at least one lateral surface 31 that resides in the well opening 11 about the gap 13 when the slidable securing member 30 is positioned in a first, bit-securing position such that at least part of the lateral surface(s) 31 interact(s) with at least part of pertinent portion(s) of the bit 9, say, the first portion 9F about the neck 9N, to secure the bit 9 when it is received in the well opening(s) 11 of the body 10. The slidable securing member 30 also has at least one notch 33 in the at least one lateral surface 31, which passes into the pertinent well opening 11 about the relevant gap 13 when the slidable securing member 30 is positioned in a second, bit-releasing position such that the pertinent part(s) of the lateral surface(s) 31 does not interact with the pertinent portion(s) of the bit 9 so that it is not secured in the corresponding well opening 11 and may be removed. The slidable securing member 30 may be provided with leg 35 to fit in the slot 21 in the second end 10S of the body 10 such that a round-shafted or otherwise shaped slidable securing member 30 that may otherwise rotate in the passageway 20 can be kept from rotating, and such that lengthwise travel of a slidable securing member 30 can be restricted. The leg 35 may be provided by bending a tip end of the slidable securing member 30, or by molding or insertion of a pin transversely into a hole provided in the lateral surface 31. Spring 37, for example, a compression spring, may rest against head 39 of the slidable securing member 30 and bias it such that, when the slidable securing member 30 is not activated for travel, it is forced outwardly to a predetermined default position that provides for alignment of the lateral surface(s) 31 with corresponding gap(s) 13 to maintain securement of any bit(s) properly positioned in corresponding well opening(s) 11. In lieu of the leg 35, a peened or the like head 39P may be provided especially after insertion of a cylindrically rodlike slidable securing member 30 with notches 33 encircling it (FIG. 6) through a drilled cylindrical passageway 20.

Accordingly, the caddy 100 is or can be configured to be attachable to the tool 8, and be positioned to removably secure and store tool bit(s) 9, beneficially mechanically, when not in use with the tool 8. Upon removal from the tool 8, or at any suitable time as may be desired, a bit 9 can be stored again in the caddy 100.

To assist in operation and/or attachability to the tool 8, the caddy 100 may be provided with support/mount 40, which may have end wall 41 for enclosing the slot 21, say, connected to extensible side wall 42 for enclosing a passage that may have flange 43, say, protruding from the top, and bottom 44 that may only need to be present as a conveniently provided feature in conjunction with non-blind well opening(s) 11 and otherwise preferably absent. The flange 43 may be configured to be received in slot 8S of the tool 8 so as to stabilize mounting of the caddy 100 to the tool 8, which can assist in maintaining the orientation of the caddy 100 with respect to the tool 8 such that, for example, the caddy. 100 does not pivot about a screw 18 that may be employed solely for the mounting. Mounting hole(s) 45 may be provided, through which, for example, the bolts 18 may pass to be threaded into a housing of the tool 8. Fasteners such as mentioned above, other than the bolts 18, may be employed as means for attaching the caddy to the tool, which also may include employment of adhesives, welding, brazing, soldering, strapping, tying, riveting, and so forth and the like. Bolt and threaded receptor type fasteners are advantageously employed. Preferably, the support 40 is configured to keep bits 9, or least the greater share of them, available, for employment with the tool 8 below the worker's hand that grasps the tool 8 in use.

Figure 9:
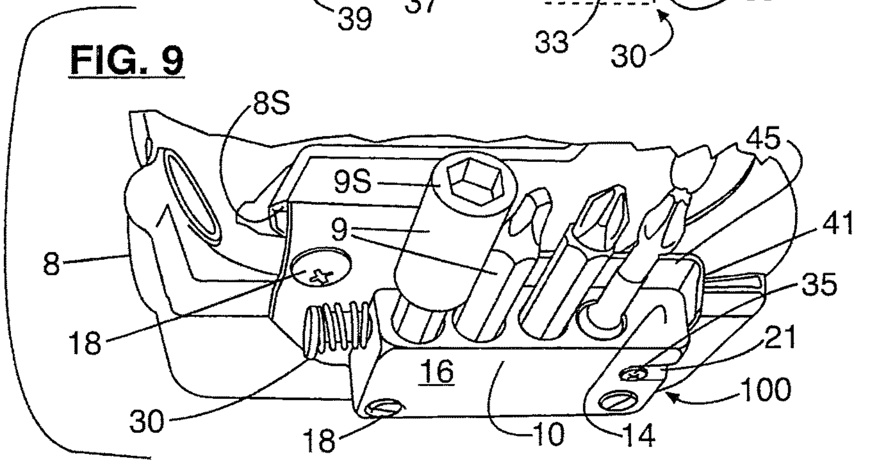
FIG. 9 is a top, outside perspective view of a caddy embodiment such as of FIG. 1, attached to a tool, here, a hand-held, cordless electric power impact drill.

The caddy 100 can be compact in size, a desirable advantage. For instance, including the support 40, the caddy 100 can be overall including any vertically directed extensible side wall 42 about from half or three quarters of an inch to two or two and one half inches in height (along the first direction 11D), for example, about one and one half of an inch high (such as depicted in FIGS. 1 and 9). Its body 10, for example, in a shape of a rectangular box, can be about from half or three quarters of an inch to one or one and one half inches in height (along first direction 11D), for example, about one inch or one and one eight of an inch high; about from one to three or four inches in length, for example, about two inches long; and about from three eighths to three fourths of an inch to one inch in width, for example, about half of an inch wide.

Also, individual well openings 11 and so forth may each have an individual corresponding slidable securing member 30 or other detent securing member construction with its associated components so that each well opening 11 is controlled individually rather than as a group. For example, such an arrangement may have a plurality of slidable securing members 30 activated in a direction perpendicular to the securing member 30 of FIGS. 1 and 9.

Figure 10A:
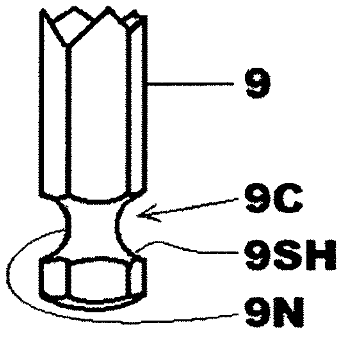
FIGS. 10A-10G illustrate further tool bit caddy embodiments. These predominantly illustrate various detent fixing and detent securing members.
Figure 10B:
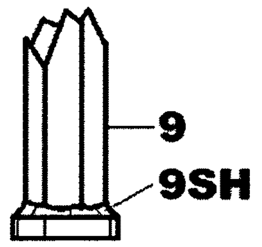
Figure 10C:
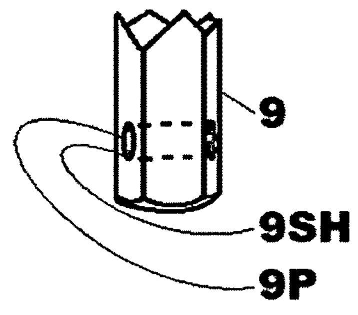
Figure 10D:
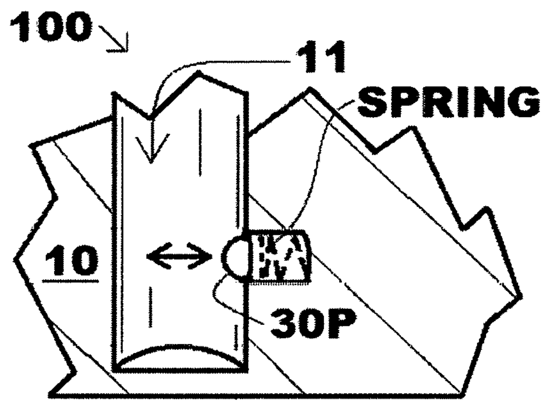
Figure 10E:
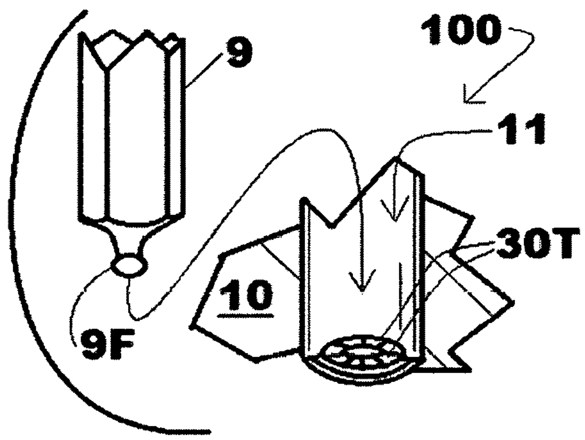
Figure 10F:
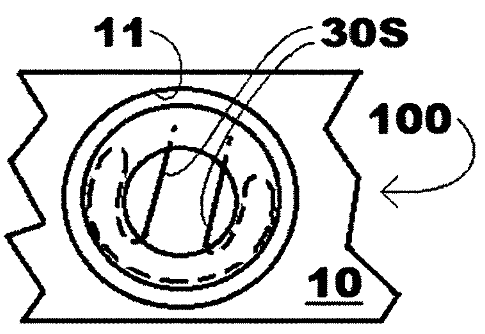
Figure 10G:
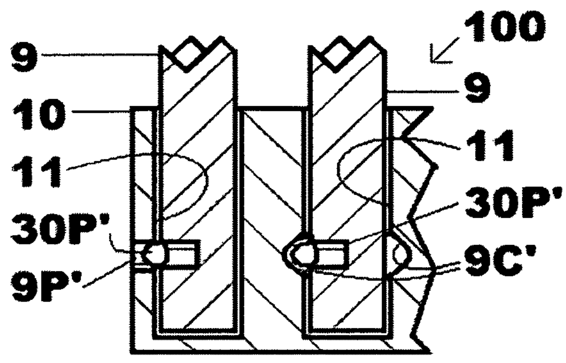

The detent fixing member may be considered to be a detent catch, and the detent catch may be in a form of a detent shoulder, concavity or perforation. Thus the neck 9N of the bit 9 has detent concavity 9C and detent shoulder 9SH as a detent catch (FIG. 10A). Detent shoulder 9SH without a concavity may be provided by a head protruding from a tool bit shaft (FIG. 10B). Perforation through-hole 9P may be provided as a detent catch (FIG. 10C). The detent securing member may have a biased spring element for interacting with the detent fixing member, say, as noted above (e.g., slidable securing member 30); or a biased-spring plunger 30P, which may be a suitable ball-nose or long-nose spring plunger; spring snap tab(s) 30T; or a spring snap fastener 30S such an S-spring press fastener (FIGS. 10D-10F). The detent fixing member may have element(s) of a detent securing member as above, say, a spring-biased plunger 30P', with the detent securing member being detent concavity 9C' or perforation through-hole 9P' (FIG. 10G).

CONCLUSION TO THE INVENTION

The present invention is thus provided. Various feature(s), part(s), step(s), subcombination(s) and/or combination(s) can be employed with or without reference to, or order of, other feature(s), part(s), step(s), subcombination(s) and/or combination(s) in the practice of the invention, and numerous and sundry adaptations and modifications can be effected within its spirit, the literal claim scope of which is particularly pointed out by the following claims:

What is claimed is:

1. A caddy for removably securing and storing a tool bit for use with a tool when the bit is not in use with the tool, and upon removal from the tool, when desired, storing it again therein, which comprises the following:

a body having a plurality of well openings therein, which extend in a first direction, and each well opening of the plurality of well openings is configured to releasably receive a portion of the bit, wherein the portion of the bit releasably received includes a detent fixing member;

a passageway extending through at least part of the body in communication with each well opening of the plurality of well openings;

a detent securing member having an elongate shape spanning the plurality of well openings, slideable in the passageway, and penetrating at least in part into the plurality of well openings, the detent securing member having a lateral surface that resides in each well opening of the plurality of well openings when the detent securing member is positioned in a first, bit-securing position such that at least part of the lateral surface interacts with the detent fixing member of the bit to secure the bit when the bit is received in its corresponding well opening of the body; and such that, when the detent securing member is positioned in a second, bit-releasing position, the at least one part of the lateral surface does not interact with the detent fixing member of the portion of the bit releasably received so that the bit is not secured in the at least one well opening;

wherein the caddy is configured to be attachable to the tool, and, as a detent with respect to the detent fixing member and the detent securing member, removably secure and store the tool bit for use with the tool when the bit is not in use with the tool, and upon removal from the tool, when desired, store it again therein; the tool is a hand-held power tool that employs exchangeable bits; the detent securing member has a biased spring element for assisting positioning of the detent securing member with respect to the detent fixing member; and at least one of the following elements (A, B) is present:

A) the body has opposing ends and a slot communicating with the passageway in the body on at least one of the opposing ends, and the detent securing member has a leg that slideably fits in the slot; and B) a support/mount with a vertically extensible side wall and a protruding member laterally extending from the side wall, which is configured for reception in a corresponding cavity of the tool so as to stabilize mounting of the caddy to the tool and assist in maintaining orientation of the caddy with respect to the tool, is provided the caddy.

2. The caddy of claim 1, wherein the detent fixing member is a detent catch, and the hand-held power tool that employs exchangeable bits is a drill.

3. The caddy of claim 2, wherein the detent catch is in a form of at least one of a detent shoulder, a detent concavity, and a detent perforation.

4. The caddy of claim 1, wherein the element "A" is present.

5. The caddy of claim 2, wherein the element "A" is present.

6. The caddy of claim 3, wherein the element "A" is present.

7. The caddy of claim 1, which does not employ a plastic sideways-fitting press-in bit holder open on a side where the bit is pressed-in; a tight fitting, squeezing plastic or rubber tube bit holder, or a magnetic bit holder that uses magnetic force to hold the tool bit.

8. The caddy of claim 1, which is attached to, in combination with, the tool.

9. A caddy for removably securing and storing a tool bit for use with a tool when the tool bit is not in use with the tool, and upon removal from the tool, when desired, storing it again therein, which comprises the following:

a body having a plurality of well openings therein, which extend in a first direction, and each well opening of the plurality of well openings is configured to releasably receive a portion of the bit, which has a detent fixing member in a form of a detent catch;

a passageway extending through at least part of the body in a second direction different than the first direction and in communication with the well opening;

a detent securing member in a form of an elongate member spanning the plurality of well openings, residing and slidable in the passageway and penetrating at least in part into the well opening, and having an associated biased-spring element, the detent securing member also having the following:

a lateral surface that resides in each well opening of the plurality of well openings when the detent securing member is positioned in a first, bit-securing position such that at least part of the lateral surface interacts with the detent fixing member of the at least one portion of the bit to secure the bit when the bit is received in its corresponding well opening of the body; and at least one notch in the lateral surface, which passes into a gap when the detent securing member is positioned in a second, bit-releasing position such that the at least one part of the lateral surface does not interact with the detent fixing member of the at least one portion of the bit releasably received so that the bit is not secured in the at least one well opening;

wherein the caddy is configured to be attachable to the tool, and removably secure and store the tool bit for use with the tool when the bit is not in use with the tool, and upon removal from the tool, when desired, store it again therein; the tool is a hand-held power impact drill that employs exchangeable bits; and at least one of the following elements (A, B) is present:

A) the body has opposing ends and a slot communicating with the passageway in the body on at least one of the opposing ends, and the detent securing member has a leg that slideably fits in the slot; and B) a support/mount with a vertically extensible side wall and a protruding member laterally extending from the side wall, which is configured for reception in a corresponding cavity of the tool so as to stabilize mounting of the caddy to the tool and assist in maintaining orientation of the caddy with respect to the tool, is provided the caddy.

10. The caddy of claim 9, wherein the element "A" is present.

11. The caddy of claim 10, wherein the detent catch is in a form of a detent concavity; the protruding member laterally extending from the side wall is in a form of a flange laterally extending from the side wall; and the corresponding cavity of the tool is in a form of a slot.

12. The caddy of claim 9, which employs material(s) in its construction that are non-magnetic.

13. The caddy of claim 9, which does not employ a plastic sideways-fitting press-in bit holder open on a side where the bit is pressed in; a tight fitting, squeezing plastic or rubber tube bit holder; or a magnetic bit holder that uses magnetic force to hold the tool bit.

14. The caddy of claim 9, which is attached to, in combination with, the tool.

15. A caddy for removably securing and storing at least one or more than one tool bit for use with the tool when the at least one or more than one bit is not in use with the tool, and upon removal from the tool, when desired, storing it again therein, which comprises at least one of the following Embodiments (A, B), each of which does not employ a plastic sideways-fitting press-in bit holder open on a side where the at least one or more than one tool bit is pressed in; a tight fitting squeezing plastic or rubber tube bit holder; or a magnetic bit holder that uses magnetic force to hold the at least one or more than one tool bit;

Embodiment "A":

a body having a plurality of well openings therein, which extend in a first direction, and each well opening of the plurality of well openings is configured to releasably receive a portion of the bit, wherein the portion of the bit releasably received includes a detent fixing member;

a passageway extending through at least part of the body in communication with each well opening of the plurality of well openings;

a detent securing member having an elongate shape spanning the plurality of well openings, slideable in the passageway, and penetrating at least in part into the plurality of well openings, the detent securing member having a lateral surface that resides in each well opening of the plurality of well openings when the detent securing member is positioned in a first, bit-securing position such that at least part of the lateral surface interacts with the detent fixing member of the bit to secure the bit when the bit is received in its corresponding well opening of the body; and such that, when the detent securing member is positioned in a second, bit-releasing position, the at least one part of the lateral surface does not interact with the detent fixing member of the portion of the bit releasably received so that the bit is not secured in the at least one well opening;

wherein the caddy is configured to be attachable to the tool, and, as a detent with respect to the detent fixing member and the detent securing member, removably secure and store the tool bit for use with the tool when the bit is not in us with the tool and upon removal from the tool, when desired, store it again therein; and the tool is a hand-held power tool that employs exchangeable bits; and Embodiment “B”:

a body having therein at least one well opening that communicates with a bottom thereof, the well opening being configured to releasably receive at least a portion of a corresponding bit, wherein the portion of the corresponding bit releasably received includes a detent fixing member; and a detent securing member correspondingly positioned in the at least one well opening at the bottom thereof, selected from the group consisting of a spring snap tab and a spring snap fastener to releasably receive, as female element, the portion of the corresponding bit releasably received, as a corresponding male element, in the at least one well opening at the bottom thereof by interaction with the detent fixing member, wherein the detent securing member does not have a coiled spring plunger;

wherein the caddy is configured to be attachable to the tool, and removably secure and store the corresponding bit(s) for use with the tool when the corresponding bit(s) is(are) not in use with the tool, and upon removal from the tool, when desired, store it(them) again therein; and the tool is a hand-held power tool that employs exchangeable bit(s).

16. The caddy of claim 15, wherein Embodiment “B” is present, nd the detent securing member is the spring snap fastener, and the spring snap fastener is an S-sprig press fastener.

17. The caddy of claim 15, which is attached to, in combination with, the tool.

18. The caddy of claim 15, wherein a support/mount with a vertically extensible side wall and a protruding member laterally extending from the side wall, which is configured for reception in a corresponding cavity of the tool so as to stabilize mounting of the caddy to the tool and assist in maintaining orientation of the caddy with respect to the tool, is provided the caddy.

19. The caddy of claim 16, wherein a support/mount with a vertically extensible side wall and a protruding member laterally extending from the side wall, which is configured for reception in a corresponding cavity of the tool so as to stabilize mounting of the caddy to the tool and assist in maintaining orientation of the caddy with respect to the tool, is provided the caddy.

20. The caddy of claim 17, wherein a support/mount with a vertically extensible side wall and a protruding member laterally extending from the side wall, which is configured for reception in a corresponding cavity of the tool so as to stabilize mounting of the caddy to the tool and assist in maintaining orientation of the caddy with respect to the tool, is provided the caddy.

* * * * *